(12) United States Patent
Hung (10) Patent No.: US 10,474,205 B2
(45) Date of Patent: Nov. 12, 2019

(54) MECHANISM OF DISK HOLDING DEVICE FOR RECEIVING MULTIPLE UNITS

(71) Applicant: CHENBRO MICOM CO., LTD., New Taipei (TW)

(72) Inventor: Shih-Wei Hung, New Taipei (TW)

(73) Assignee: CHENBRO MICOM CO., LTD., New Taipei (TW)

( * ) Notice: Subject to any disclaimer, the term of this patent is extended or adjusted under 35 U.S.C. 154(b) by 0 days.

(21) Appl. No.: 16/152,393

(22) Filed: Oct. 4, 2018

(65) Prior Publication Data

US 2019/0107868 A1  Apr. 11, 2019

(30) Foreign Application Priority Data

Oct. 6, 2017 (TW) .............................. 106214885 U (51) Int. Cl.
G06F 1/16 (2006.01)
G06F 1/18 (2006.01)

(52) U.S. Cl.
CPC .............. G06F 1/182 (2013.01); G06F 1/187 (2013.01)

(58) Field of Classification Search
CPC ..... G06F 1/187; G11B 33/027; G11B 33/125; G11B 33/128
USPC ........................................ 361/679.33, 679.37
See application file for complete search history.

(56) References Cited

U.S. PATENT DOCUMENTS

| | | | | |
|---|---|---|---|---|
| 5,112,119 A * | 5/1992 | Cooke | ..................... | G06F 1/184 312/283 |
| 5,224,019 A * | 6/1993 | Wong | ..................... | G06F 1/184 361/679.32 |
| 5,299,089 A * | 3/1994 | Lwee | ..................... | G06F 1/184 361/679.33 |
| 5,768,099 A * | 6/1998 | Radloff | .................... | G06F 1/184 360/137 |
| 6,507,487 B1 * | 1/2003 | Barina | .................... | G06F 1/184 312/236 |
| 6,700,776 B2 * | 3/2004 | Bang | ........................ | G06F 1/181 312/223.1 |
| 6,956,737 B2 * | 10/2005 | Chen | ....................... | G06F 1/184 312/223.1 |
| 8,023,259 B2 | 9/2011 | Lam et al. | | |
| 8,649,167 B2 * | 2/2014 | Bala | ..................... | G11B 33/128 361/679.01 |

(Continued)

FOREIGN PATENT DOCUMENTS

TW    M268640 U    6/2005
TW    M283290 U    12/2005

(Continued)

*Primary Examiner* — Anthony Q Edwards
(74) *Attorney, Agent, or Firm* — CKC & Partners Co., LLC (57) ABSTRACT

A multi-unit receiving mechanism includes a bottom case, a first cover body, and a second cover body. The first cover body is pivotally connected to the bottom case for being rotatable to cover the bottom case, so as to define a first receiving space therebetween. A first electronic unit is removably held in the first receiving space. The second cover is pivotally connected to the first cover body for being rotatable to cover the first cover body and the bottom case, so as to define a second receiving space therebetween. A second electronic unit is removably held in the second receiving space. A second cover removably holds a third electronic unit.

20 Claims, 9 Drawing Sheets

(56) References Cited

U.S. PATENT DOCUMENTS

| | | | |
|---|---|---|---|
| 8,707,531 B1 * | 4/2014 | Sungkhaphong | G11B 33/00 29/281.1 |
| 9,176,546 B2 | 11/2015 | Chen et al. | |
| 9,282,658 B1 * | 3/2016 | Tsai | G11B 33/124 |
| 2003/0103325 A1 * | 6/2003 | Resnick | G06F 1/184 361/679.59 |
| 2010/0277861 A1 * | 11/2010 | Roesner | G11B 33/128 361/679.33 |
| 2012/0056515 A1 * | 3/2012 | Chen | G06F 1/187 312/223.2 |
| 2013/0301211 A1 * | 11/2013 | Guo | G06F 1/187 361/679.38 |
| 2015/0003006 A1 * | 1/2015 | Chi | G06F 1/187 361/679.39 |
| 2017/0053678 A1 * | 2/2017 | Albrecht | G11B 25/043 |

FOREIGN PATENT DOCUMENTS

| | | |
|---|---|---|
| TW | M306453 U | 2/2007 |
| TW | M472931 U | 2/2014 |
| TW | M488726 U | 10/2014 |
| TW | M499741 U | 4/2015 |
| TW | 201517035 A | 5/2015 |
| TW | I486951 B | 6/2015 |
| TW | M526094 U | 7/2016 |
| TW | I550602 B | 9/2016 |
| TW | I564885 B | 1/2017 |

* cited by examiner

MECHANISM OF DISK HOLDING DEVICE FOR RECEIVING MULTIPLE UNITS

RELATED APPLICATIONS

This application claims priority to Taiwan Application Serial Number 106214885, filed Oct. 6, 2017, which is herein incorporated by reference.

BACKGROUND

Field of Disclosure

The disclosure relates to a receiving mechanism. More particularly, the disclosure relates to a disk holding device and a mechanism of the disk holding device for receiving multiple units.

Description of Related Art

In general, a server computer has a data access device (such as a disk drive, a hard disk drive, a CD player, a CD burner machine, etc.) that is generally installed in a chassis of the server computer and is used to store computer data for further extending or enhancing the functionality of the server computer. In addition, the server computer also is desired to accommodate a large number of hard disks in the chassis to maximize the storage capacity of the server computer.

However, methods of placing a data access device in the chassis are no more than directly fastening the data access device to the chassis by screws. Thus, when the data access device is assembled or disassembled, many screws need to be tightened or loosened, thus resulting in complicated process, inconvenient operation and time waste.

SUMMARY

One aspect of disclosure is to provide a disk holding device and a mechanism for receiving multiple units, so as to overcome the aforementioned difficulties in the prior art.

In one embodiment of the disclosure, a mechanism for receiving multiple units is provided. The mechanism includes a bottom case, a first cover body, a second cover body, a first toolless fixing portion, a second toolless fixing portion and a third toolless fixing portion. The first cover body is pivotally connected to the bottom case and pivots to cover the bottom case, such that a first receiving space is defined between the bottom case and the first cover body. The second cover body is pivotally connected to the first cover body and pivots to cover the first cover body and the bottom case, such that a second receiving space is defined between the first cover body and the second cover body. The first toolless fixing portion is disposed within the first receiving space for removably holding a first electronic unit. The second toolless fixing portion is disposed within the second receiving space for removably holding a second electronic unit. The third toolless fixing portion is disposed on the second cover body, for removably holding a third electronic unit.

According to one or more embodiments of the disclosure, in the mechanism, the first toolless fixing portion is disposed on the bottom case or the first cover body.

According to one or more embodiments of the disclosure, in the mechanism, the second toolless fixing portion is disposed on the first cover body or the second cover body.

According to one or more embodiments of the disclosure, in the mechanism, the third toolless fixing portion is disposed on one surface of the second cover body facing towards the second receiving space. Alternatively, the third toolless fixing portion is disposed on one surface of the second cover body opposite to the second receiving space.

According to one or more embodiments of the disclosure, in the mechanism, the second toolless fixing portion and the third toolless fixing portion are opposite arranged in the second receiving space.

According to one or more embodiments of the disclosure, in the mechanism, the first toolless fixing portion includes a first engaging elastic plate and at least one first engaging bump. The first engaging elastic plate is disposed opposite to one side plate of the bottom case. The first engaging bump is formed on the first engaging elastic plate, such that the first electronic unit is directly sandwiched between the first engaging bump and the one side plate of the bottom case.

According to one or more embodiments of the disclosure, in the mechanism, the second toolless fixing portion includes a second engaging elastic plate and at least one second engaging bump. The second engaging elastic plate is disposed opposite to one side plate of the first cover body. The second engaging bump is formed on the second engaging elastic plate, such that the second electronic unit is directly sandwiched between the second engaging bump and the one side plate of the first cover body.

According to one or more embodiments of the disclosure, in the mechanism, the third toolless fixing portion includes a third engaging elastic plate and at least one third engaging bump. The third engaging elastic plate is disposed opposite to one side plate of the second cover body. The third engaging bump is formed on the third engaging elastic plate, such that the third electronic unit is directly sandwiched between the third engaging bump and the one side plate of the second cover body.

According to one or more embodiments of the disclosure, the mechanism further includes a first fastening portion and a second fastening portion. The first fastening portion is disposed on the bottom case. The second fastening portion is disposed on the second cover body, and detachably fastened with the first fastening portion. When the second fastening portion is fastened with the first fastening portion, the first cover body is fixedly sandwiched between the bottom case and the second cover body.

According to one or more embodiments of the disclosure, the mechanism further includes a first cushion member and a second cushion member. The first cushion member is disposed within the first receiving space, and disposed between the bottom case and the first cover body. The second cushion member is disposed within the first receiving space, and disposed between the first cover body and the second cover body.

According to one or more embodiments of the disclosure, the mechanism further includes a first holding bracket, a second holding bracket and a third holding bracket. The first holding bracket is disposed within the first receiving space for guiding and stably receiving a first connector. The second holding bracket is disposed within the second receiving space for guiding and stably receiving a second connector. The third holding bracket is disposed on the second cover body for guiding and stably receiving a third connector.

According to one or more embodiments of the disclosure, in the mechanism, the bottom case, the first cover body and the second cover body are pivotally connected one another coaxially.

In one embodiment of the disclosure, a mechanism for receiving multiple units is provided. The mechanism includes a bottom case, a first cover body and a second cover body. The bottom case includes a first loading surface and a first toolless fixing portion disposed on the first loading surface for removably holding a first electronic unit. The first cover body rotatably covers the bottom case, and includes a second loading surface and a second toolless fixing portion disposed on the second loading surface for removably holding a second electronic unit. The second cover body rotatably covers the bottom case and the first cover body, and includes a third loading surface and a third toolless fixing portion disposed on the third loading surface for removably holding a third electronic unit. Thus, the first loading surface, the second loading surface and the third loading surface are overlapped with one another such that a normal line of the first loading surface passes through both of the second loading surface and the third loading surface simultaneously.

According to one or more embodiments of the disclosure, in the mechanism, the first toolless fixing portion includes a first engaging elastic plate and at least one first engaging bump. The first engaging elastic plate is disposed opposite to one side plate of the bottom case. The first engaging bump is formed on the first engaging elastic plate, such that the first electronic unit is directly sandwiched between the first engaging bump and the one side plate of the bottom case.

According to one or more embodiments of the disclosure, in the mechanism, the second toolless fixing portion includes a second engaging elastic plate and at least one second engaging bump. The second engaging elastic plate is disposed opposite to one side plate of the first cover body. The second engaging bump is formed on the second engaging elastic plate, such that the second electronic unit is directly sandwiched between the at least one second engaging bump and the one side plate of the first cover body.

According to one or more embodiments of the disclosure, in the mechanism, the third toolless fixing portion includes a third engaging elastic plate and at least one third engaging bump. The third engaging elastic plate is disposed opposite to one side plate of the second cover body. The third engaging bump is formed on the third engaging elastic plate, such that the third electronic unit is directly sandwiched between the at least one third engaging bump and the one side plate of the second cover body.

According to one or more embodiments of the disclosure, the mechanism further includes a first fastening portion and a second fastening portion. The first fastening portion is disposed on the bottom case. The second fastening portion is disposed on the second cover body, and detachably fastened with the first fastening portion. When the second fastening portion is fastened with the first fastening portion, the first cover body is fixedly sandwiched between the bottom case and the second cover body.

According to one or more embodiments of the disclosure, the mechanism further includes a first cushion member and a second cushion member. The first cushion member is disposed between the bottom case and the first cover body. The second cushion member is disposed between the first cover body and the second cover body.

According to one or more embodiments of the disclosure, the mechanism further includes a pivot shaft connecting the bottom case, the first cover body and the second cover body together such that the first cover body is able to movably cover the bottom case, and the second cover body is able to movably cover the first cover body.

In one embodiment of the disclosure, a mechanism for receiving multiple units is provided. The mechanism includes a bottom case, a first cover body, a second cover body, a pivot shaft, a first toolless fixing portion and a second toolless fixing portion. The first cover body is disposed between the bottom case and the second cover body, and a first receiving space is defined between the bottom case and the first cover body, a second receiving space is defined between the first cover body and the second cover body. The pivot shaft is pivotally connected to the bottom case, the first cover body and the second cover body such that the first cover body is enabled to movably cover the bottom case. The second cover body is enabled to movably cover the first cover body. The first toolless fixing portion is disposed within the first receiving space for removably holding a first electronic unit. The second toolless fixing portion is disposed within the second receiving space for removably holding a second electronic unit. One surface of the second cover body opposite to the second receiving space does not have any toolless fixing portion.

Thus, with the construction of the disk holding device and the multi-unit receiving mechanism of the aforementioned embodiments, the electronic units can be rapidly inserted into or removed from the disk holding device with the receiving mechanism, thereby overcoming the aforementioned disadvantages of complex process, inconvenient operation and time waste.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
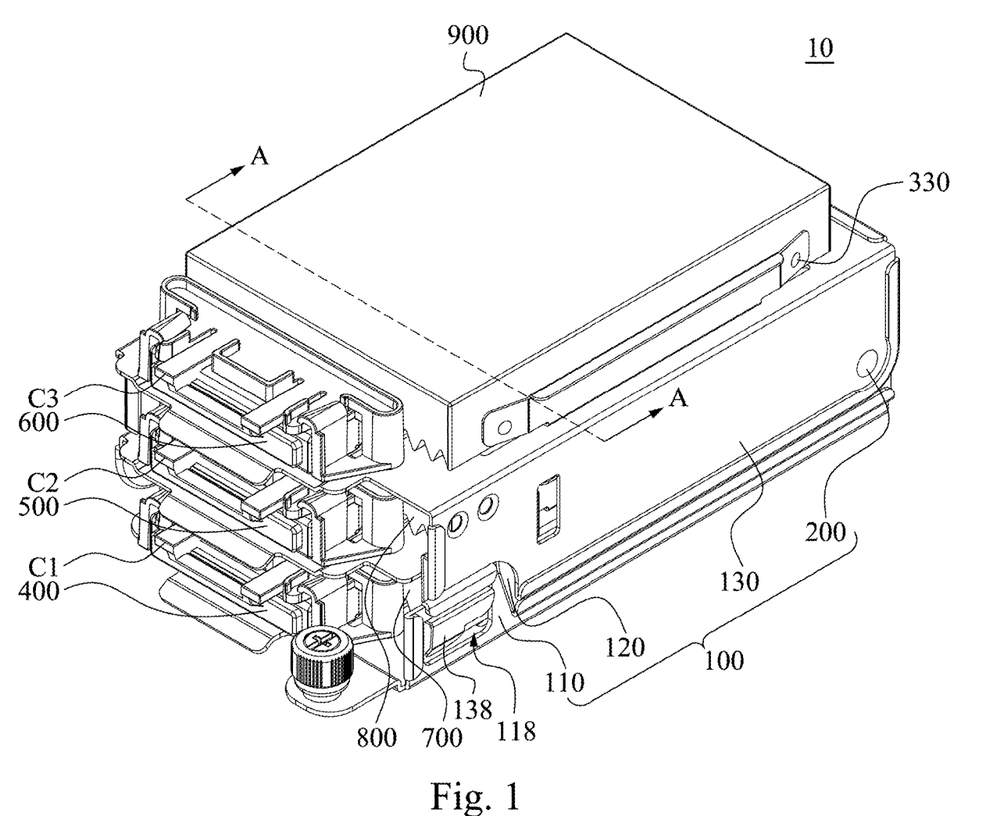
FIG. 1 is a perspective view of a disk holding device according to one embodiment of the disclosure.
Figure 2:
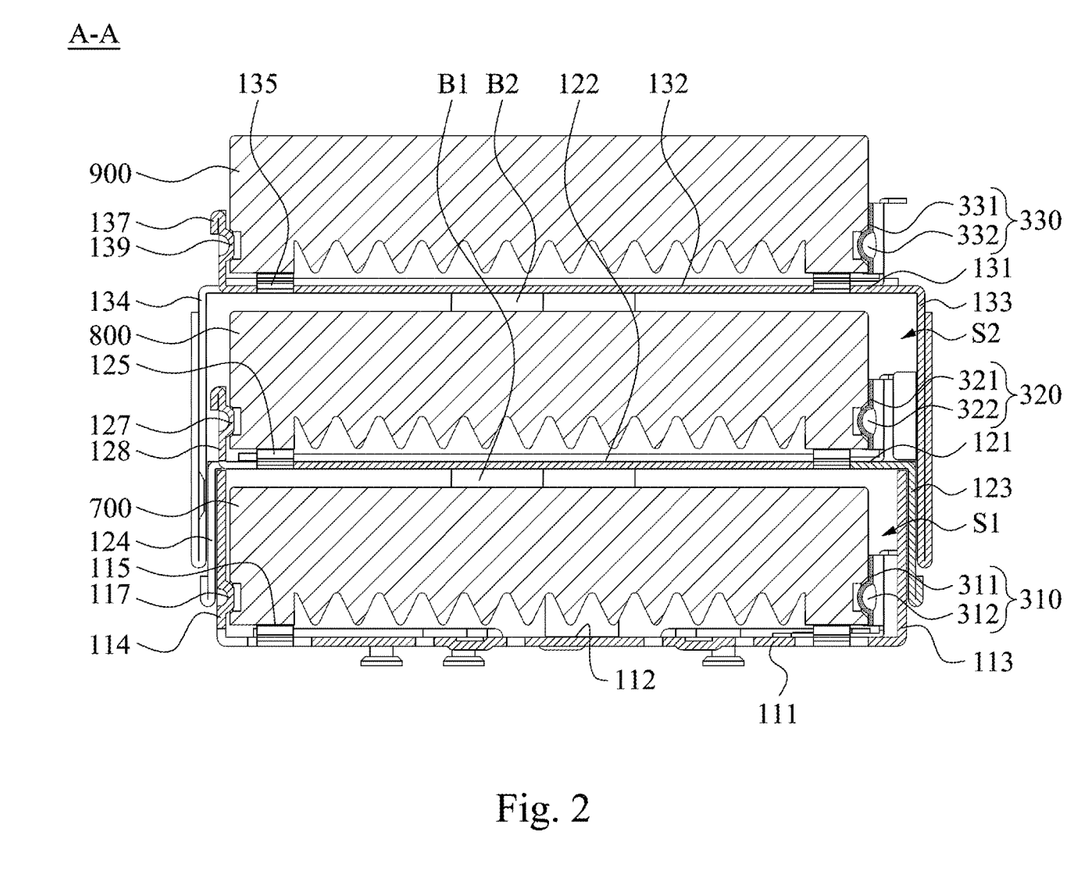
FIG. 2 is a cross-sectional view of FIG. 1 viewed along a line A-A.
Figure 3A:
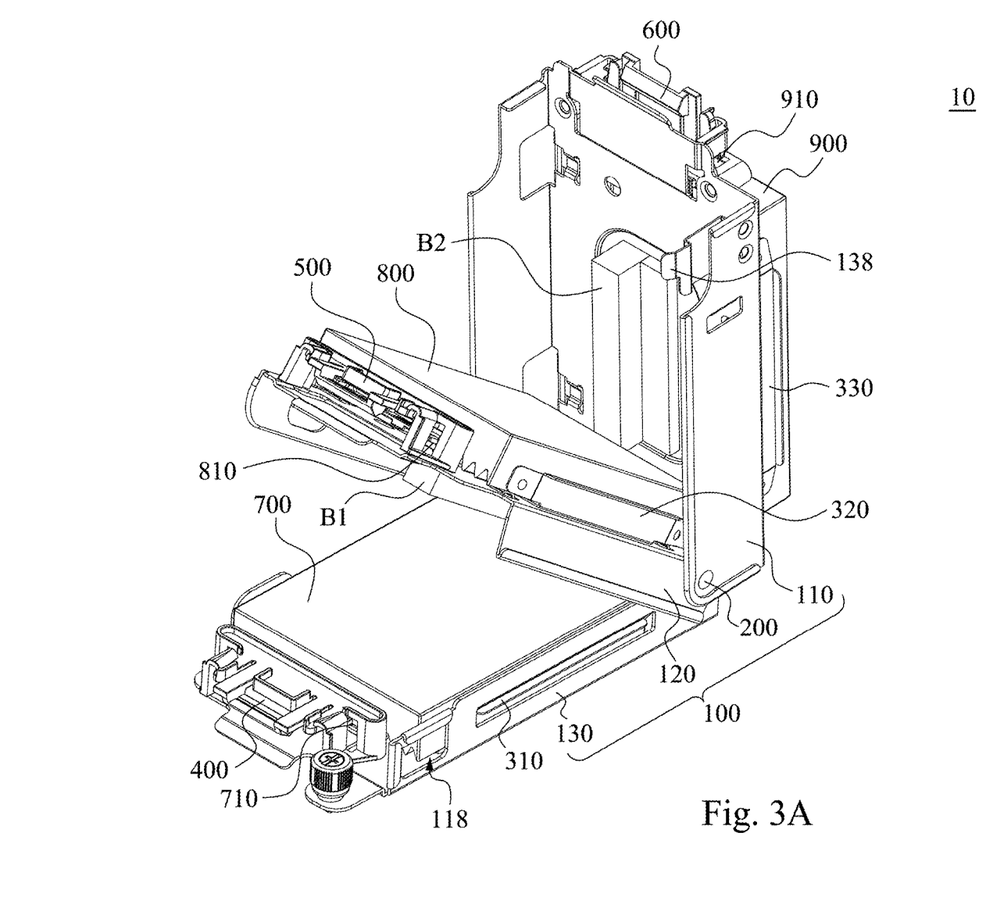
FIG. 3A and FIG. 3B are operational schematic views of the disk holding device of FIG. 1.
Figure 3B:
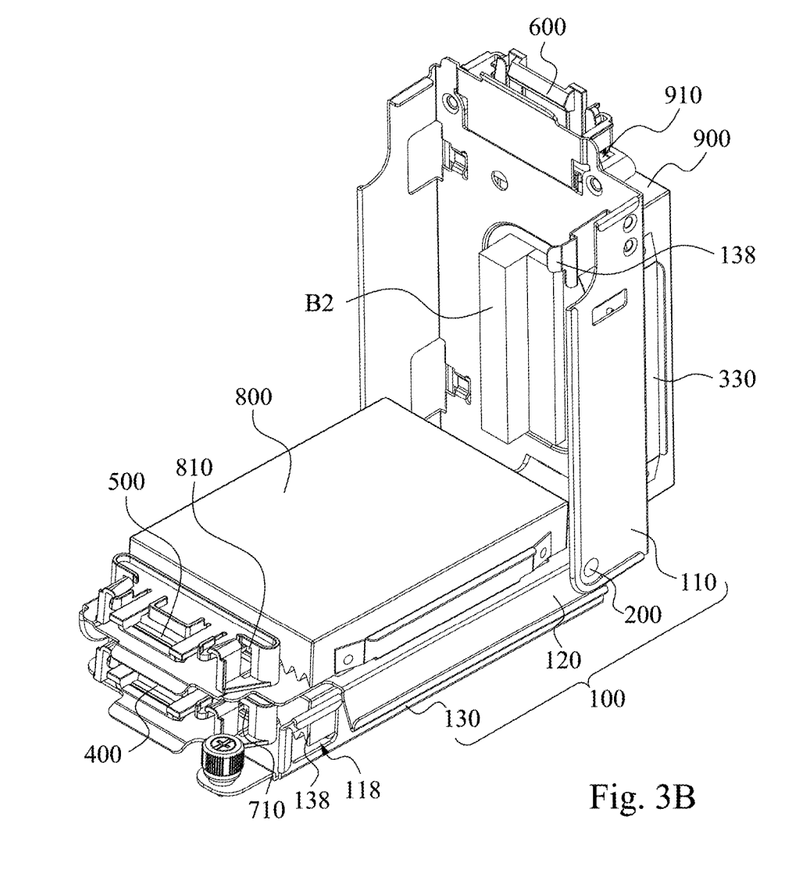

Reference is now made to FIG. 1 to FIG. 3B, in which FIG. 1 is a perspective view of a disk holding device 10 according to one embodiment of the disclosure, FIG. 2 is a cross-sectional view of FIG. 1 viewed along a line A-A, and FIG. 3A and FIG. 3B are operational schematic views of the disk holding device 10 of FIG. 1. As shown in FIG. 1 and FIG. 3B, in the embodiment, a disk holding device 10 includes a multi-unit receiving mechanism 100. The multi-unit receiving mechanism 100 includes a bottom case 110, a first cover body 120 and a second cover body 130. The first cover body 120 is pivotally connected to the bottom case 110 and pivots to cover the bottom case 110, such that a first receiving space S1 is defined between the bottom case 110 and the first cover body 120. The second cover body 130 is pivotally connected to the first cover body 120 and pivots to cover the first cover body 120 and the bottom case 110 such that a second receiving space S2 is defined between the first cover body 120 and the second cover body 130. The multi-unit receiving mechanism 100 further includes a first toolless fixing portion 310, a second toolless fixing portion 320 and a third toolless fixing portion 330. The first toolless fixing portion 310 is disposed within the first receiving space S1 for removably holding a first electronic unit 700. The second toolless fixing portion 320 is disposed within the second receiving space S2 for removably holding a second electronic unit 800. The third toolless fixing portion 330 is disposed on the second cover body 130 for removably holding a third electronic unit 900.

In the embodiment, the bottom case 110, the first cover body 120 and the second cover body 130 are formed from a rigid material such as metal or plastic material. The first electronic unit 700, the second electronic unit 800, and the third electronic unit 900 are hard disks respectively. It is noted that, the so-called hard disk is a commonly known hard disk product, i.e., the hard disk product is a hard disk that is not received in an external hard-disk box, and thus the hard disk can also be referred to as a "naked disk". In addition, the hard disk is also not limited to a 2.5" SATA hard disk or a SSD hard disk.

However, the disclosure is not limited thereto. In another embodiment, the first electronic unit, the second electronic unit and the third electronic unit may also be disk drives, CD players or computer units respectively, and the first electronic unit, the second electronic unit, and the third electronic unit may also be of different types.

Figure 4:
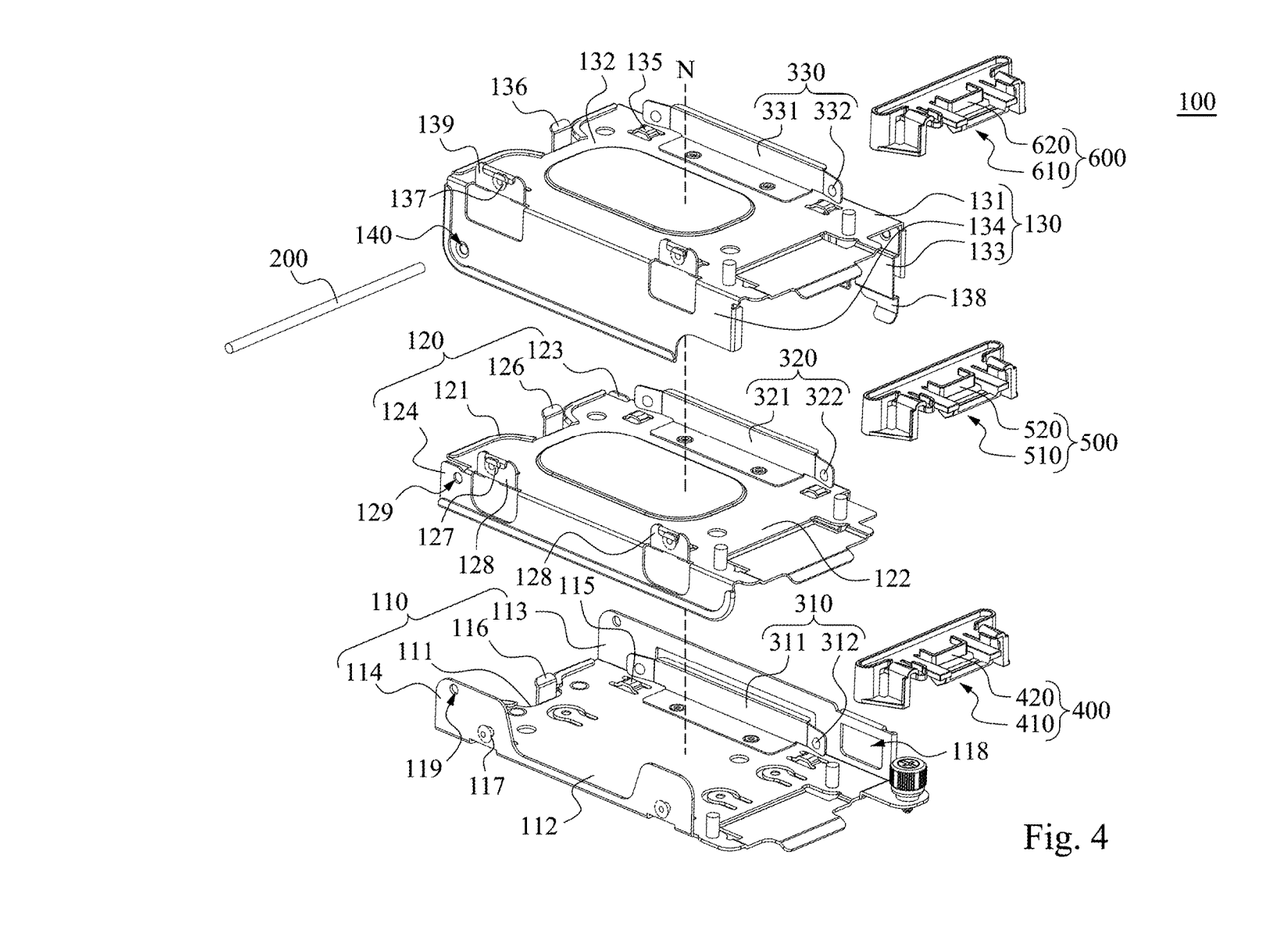
FIG. 4 is an exploded view of the multi-unit receiving mechanism of FIG. 1.

FIG. 4 is an exploded view of the multi-unit receiving mechanism 100 of FIG. 1. In the embodiment, as shown in FIG. 2 and FIG. 4, specifically, the bottom case 110 includes a first plate body 111, a first side plate 113, and at least one (e.g., two) second side plate 114. The first side plate 113 and the second side plate 114 are respectively arranged on two opposite sides of the first plate body 111, and the first side plate 113 and the second side plate 114 collectively extend towards the same direction (e.g., upward). The first plate body 111 is provided with a first loading surface 112 facing towards the first receiving space S1 so as to receive and hold the first electronic unit 700.

The first cover body 120 includes a second plate body 121, a third side plate 123 and a fourth side plate 124. The third side plate 123 and the fourth side plate 124 are respectively arranged on two opposite sides of the second plate body 121, and the third side plate 123 and the fourth side plate 124 collectively extend towards the same direction (e.g., downward). Thus, when the first cover body 120 is rotated to cover the bottom case 110, the second plate body 121 faces towards the first plate body 111, and the third side plate 123 covers the outer side of the first plate body 111, and the fourth side plate 124 covers the outer side of the second side plate 114 so as to define that the aforementioned first receiving space S1 is arranged between the first cover body 120 and the bottom case 110. The second plate body 121 is provided with a second loading surface 122 facing towards the second receiving space S2 and facing away from the first receiving space S2 so as to receive and hold the second electronic unit 800.

The second cover body 130 includes a third plate body 131, a fifth side plate 133 and a sixth side plate 134. The fifth side plate 133 and the sixth side plate 134 are respectively arranged on two opposite sides of the third plate body 131, and the fifth side plate 133 and the sixth side plate 134 collectively extend towards the same direction (e.g., downward). Thus, when the second cover body 130 is rotated to cover the first cover body 120, the third plate body 131 faces towards the second plate body 121, and the fifth side plate 133 covers the outer side of the third side plate 123 (i.e., the third side plate 123 located between the first side plate 113 and the fifth side plate 133), and the sixth side plate 134 covers the outer side of the fourth side plate 124 (i.e., the fourth side plate 124 located between the second side plate 114 and the sixth side plate 134) so as to define that the aforementioned second receiving space S2 is arranged between the second cover body 130 and the first cover body 120. The third plate body 131 is provided with a third loading surface 132 facing away from the second receiving space S2 so as to receive and hold the third electronic unit 900. The first loading surface 112, the second loading surface 122 and the third loading surface 132 are overlapped with one another, e.g., the first loading surface 112, the second loading surface 122 and the third loading surface 132 are parallel to each other, such that a normal line N of the first loading surface passes through both of the second loading surface and the third loading surface simultaneously.

In the embodiment, the bottom case 110, the first cover body 120 and the second cover body 130 are pivotally connected to one another coaxially. More particularly, the bottom case 110, the first cover body 120 and the second cover body 130 are respectively provided with a first shaft hole 119, a second shaft hole 129 and a third shaft hole 140. The multi-unit receiving mechanism 100 further includes a pivot shaft 200. The pivot shaft 200 is pivotally connected to the bottom case 110, the first cover body 120 and the second cover body 130 through the first shaft hole 119, the second shaft hole 129 and the third shaft hole 140 simultaneously. Thus, the first cover body 120 can rotate about the pivot shaft 200 to cover or expose the bottom case 110, and the second cover body 130 can rotate about the pivot shaft 200 to cover or expose the first cover body 120. However, the disclosure is not limited thereto, as long as the first cover body 120 is enabled to cover the bottom case 110, and the second cover body 130 is enabled to cover the first cover body 120 and the bottom case 110. In the embodiment, the first cover body 120 and the second cover body 130 may also be respectively pivoted on the bottom case 110 through different pivot shafts, or the second cover body may be pivotally conceded to the first cover body through another pivot shaft.

In the embodiment, the first toolless fixing portion 310 is disposed on the bottom case 110, and arranged opposite to the second side plate 114 of the bottom case 110, such that the first electronic unit 700 can be directly sandwiched between the first toolless fixing portion 310 and the second side plate 114 of the bottom case 110. More particularly, the first toolless fixing portion 310 includes a first engaging elastic plate 311 and two first engaging bumps 312. The first engaging elastic plate 311 is disposed upright on the first loading surface 112, and is arranged opposite to the second side plate 114 of the bottom case 110. The first engaging elastic plate 311 is fixedly screwed on the first loading surface 112. Two opposite end portions of the first engaging elastic plate 311 are curvedly extended towards the second side plate 114. Each of the first engaging bumps 312 is protrudingly formed on one of the opposite end portions of the first engaging elastic plate 311. One surface of the second side plate 114 facing towards the first side plate 113 is respectively provided with two first clamping bumps 117 separately arranged. Thus, as shown in FIG. 2 and FIG. 4, when the first engaging elastic plate 311 is firstly pressed by one side surface of the first electronic unit 700, and then, the second side plate 114 of the bottom case 110 is physically abutted by the opposite side surface of the first electronic unit 700, and the first electronic unit 700 can be toollessly placed into the first receiving space S1 between the first engaging elastic plate 311 and the second side plate 114 of the bottom case 110, so as to be fixedly sandwiched by the first engaging bumps 312 and the first clamping bumps 117. For example, but not to be limited thereto, the first engaging bumps 312 are monolithically formed on the first engaging elastic plate 311, and the first clamping bumps 117 are monolithically formed on the second side plate 114. In addition, the bottom case 110 further includes plural (e.g., four) first pressing portions 115. The first pressing portions 115 are arranged on the first loading surface 112 for directly pushing the bottom surface of the first electronic unit 700 to positon the first electronic unit 700. For example, but not to be limited thereto, the first pressing portions 115 are monolithically formed on the first loading surface 112 of the bottom case 110. Also, the bottom case 110 further includes a first position limited rib 116. The first position limited rib 116 is formed upright on one side of the first loading surface 112 of the bottom case 110 between the first side plate 113 and the second side plate 114, and is used to physically resist one another side surface of the first electronic unit 700. Thereby, the stability of the first electronic unit 700 received within the first receiving space S1 is increased. For example, but not to be limited thereto, the first position limited rib 116 is monolithically formed on the first loading surface 112 of the bottom case 110.

The second toolless fixing portion 320 is disposed on the first cover body 120, and arranged opposite to the fourth side plate 124 of the first cover body 120, such that the second electronic unit 800 can be directly sandwiched between the second toolless fixing portion 320 and the fourth side plate 124 of the first cover body 120. More particularly, the second toolless fixing portion 320 includes a second engaging elastic plate 321 and two second engaging bumps 322. The second engaging elastic plate 321 is disposed upright on one edge of the second loading surface 122, and is arranged opposite to at least one (e.g., two) first rib 128 of the first cover body 120 which is disposed on the opposite edge of the second loading surface 122 aligned with the fourth side plate 124. The second engaging elastic plate 321 is fixedly screwed on the second loading surface 122. Two opposite end portions of the second engaging elastic plate 321 are curvedly extended towards the first ribs 128. Each of the second engaging bumps 322 is protrudingly formed on one of the opposite end portions of the second engaging elastic plate 321. One surface of the first rib 128 facing towards the second receiving space S2 is respectively provided with at least one second clamping bump 127. Thus, as shown in FIG. 2 and FIG. 4, when the second engaging elastic plate 321 is firstly pressed by one side surface of the second electronic unit 800, and then the first ribs 128 are physically abutted by the other side surface of the second electronic unit 800, the second electronic unit 800 can be toollessly placed into the second receiving space S2 between the second engaging elastic plate 321 and the first ribs 128 to be fixedly sandwiched by the second engaging bumps 322 and the second clamping bumps 127. For example, but not to be limited thereto, the second engaging bumps 322 are monolithically formed on the second engaging elastic plate 321, and the second clamping bumps 127 are monolithically formed on the first ribs 128, respectively. In addition, the first cover body 120 further includes plural (e.g., four) second pressing portions 125. The second pressing portions 125 are arranged on the second loading surface 122 for directly pushing the bottom surface of the second electronic unit 800 to position the second electronic unit 800. For example, but not to be limited thereto, the second pressing portions 125 are monolithically formed on the second loading surface 122 of the first cover body 120. Also, the first cover body 120 further includes a second position limited rib 126. The second position limited rib 126 is formed upright on one side of the second loading surface 122 of the first cover body 120 between the second engaging elastic plate 321 and the first ribs 128, and is used to physically abut one another side surface of the second electronic unit 800. Thereby, the stability of the second electronic unit 800 received within the second receiving space S2 increased. For example, but not to be limited thereto, the second position limited rib 126 is monolithically formed on the second loading surface 122 of the first cover body 120. The first ribs 128 may be folded upwardly from the fourth side plate 124 by a stamping process.

The third toolless fixing portion 330 is disposed on the second cover body 130, and arranged opposite to the sixth side plate 134 of the second cover body 130, such that the third electronic unit 900 can be directly sandwiched between the third toolless fixing portion 330 and the sixth side plate 134 of the second cover body 130. More particularly, the third toolless fixing portion 330 includes a third engaging elastic plate 331 and two third engaging bumps 332. The third engaging elastic plate 331 is disposed upright on one edge of the third loading surface 132, and is arranged opposite to at least one (e.g., two) second rib 139 of the second cover body 130 which is disposed on the opposite edge of the third loading surface 132 aligned with the sixth side plate 134. The third engaging elastic plate 331 is fixedly screwed on the third loading surface 132. Two opposite end portions of the third engaging elastic plate 331 are curvedly extended towards the second ribs 139. Each of the third engaging bumps 332 is protrudingly formed on one of the opposite end portions of the third engaging elastic plate 331. One surface of the second rib 139 facing towards the third engaging elastic plate 331 is respectively provided with at least one third clamping bump 137. Thus, as shown in FIG. 2 and FIG. 4, when the third engaging elastic plate 331 is firstly pressed by one side surface of the third electronic unit 900, and then the second ribs 139 are physically abutted by the other side surface of the third electronic unit 900, and the third electronic unit 900 can be toollessly placed into a space between the third engaging elastic plate 331 and the second ribs 139 to be fixedly sandwiched by the third engaging bumps 332 and the third clamping bumps 137. For example, but not to be limited thereto, the third engaging bumps 332 are monolithically formed on the third engaging elastic plate 331, and the third clamping bumps 137 are monolithically formed on the second ribs 139, respectively. In addition, the second cover body 130 further includes plural (e.g., four) third pressing portions 135. The third pressing portions 135 are arranged on the third loading surface 132 for directly pushing the bottom surface of the third electronic unit 900 respectively to position the third electronic unit 900. For example, but not to be limited thereto, the third pressing portions 135 are monolithically formed on the third loading surface 132 of the second cover body 130. Also, the second cover body 130 further includes a third position limited rib 136. The third position limited rib 136 is formed upright on one side of the third loading surface 132 of the second cover body 130 between the third engaging elastic plate 331 and the second ribs 139, and is used to physically abut one another side surface of the third electronic unit 900. Thereby, the stability of the third electronic unit 900 on the third loading surface 132 is increased. For example, but not to be limited thereto, the third position limited rib 136 is monolithically formed on the third loading surface 132 of the second cover body 130. The second ribs 139 may be folded upwardly from the sixth side plate 134 by a stamping process.

In the embodiment, as shown in FIG. 3A and FIG. 4, the mechanism 100 further includes a first fastening portion 118 and a second fastening portion 138. The first fastening portion 118 is disposed on the bottom case 110. The second fastening portion 138 is disposed on the second cover body 130. The first fastening portion 118 and the second fastening portion 138 are complementary to each other such that the first fastening portion 118 and the second fastening portion 138 are detachably fastened with each other. For example, the first fastening portion 118 is a through hole formed on the first side plate 113, and the second fastening portion 138 is a hook that is formed on the fifth side plate 133 extending towards the bottom case 110. Thus, when the second fastening portion 138 is fastened with the first fastening portion 118, the first cover body 120 is fixedly sandwiched between the bottom case 110 and the second cover body 130 so as to stably receive the first electronic unit 700, the second electronic unit 800 and the third electronic unit 900.

Furthermore, in the embodiment, the mechanism 100 further includes a first cushion member B1 and a second cushion member B2. The first cushion member B1 is located within the first receiving space S1, and disposed between the bottom case 110 and the first cover body 120. Thus, when the first electronic unit 700 is received within the first receiving space S1, the first cushion member B1 is sandwiched between the first electronic unit 700 and the first cover body 120 so as to not only electrically isolate the first electronic unit 700 from the first cover body 120, but also to reduce vibrations generated from the first electronic unit 700 within the first receiving space S1. The second cushion member B2 is located within the second receiving space S2, and disposed between the first cover body 120 and the second cover body 130. Thus, when the second electronic unit 800 is received within the second receiving space S2, the second cushion member B2 is sandwiched between the second electronic unit 800 and the second cover body 130 so as to not only electrically isolate the second electronic unit 800 from the first cover body 120, but also to reduce the vibration generated from the second electronic unit 800 within the second receiving space S2.

The multi-unit receiving mechanism 100 further includes a first holding bracket 400, a second holding bracket 500 and a third holding bracket 600. The first holding bracket 400 is disposed within the first receiving space S1 for guiding and stably receiving a first connector C1. The first holding bracket 400 includes a first entrance 410 and a first engage portion 420. The first connector C1 can pass through the first entrance 410 to electrically connect to a first interface 710 of the first electronic unit 700. The first engage portion 420 is disposed within the first entrance 410 so as to detachably hold the first connector C1. The second holding bracket 500 is disposed within the second receiving space S2 for guiding and stably receiving a second connector C2. The second holding bracket 500 includes a second entrance 510 and a second engage portion 520. The second connector C2 can pass through the second entrance 510 to electrically connect to a second interface 810 of the second electronic unit 800. The second engage portion 520 is disposed within the second entrance 510 so as to detachably hold the second connector C2. The third holding bracket 600 is disposed on the second cover body 130 for guiding and stably receiving a third connector C3. The third holding bracket 600 includes a third entrance 610 and a third engage portion 620. The third connector C3 can pass through the third entrance 610 to electrically connect to a third interface 910 of the third electronic unit 900. The third engage portion 620 is disposed within the third entrance 610 so as to detachably hold the third connector C3.

In this embodiment, the first holding bracket 400 is sleeved on the first loading surface 112, the second holding bracket 500 is sleeved on the second loading surface 122, and the third holding bracket 600 is sleeved on the third loading surface 132. Each of the first connector C1, the second connector C2 and the third connector C3 is a cable connector for plugging with the interface of the electronic unit.

Figure 5:
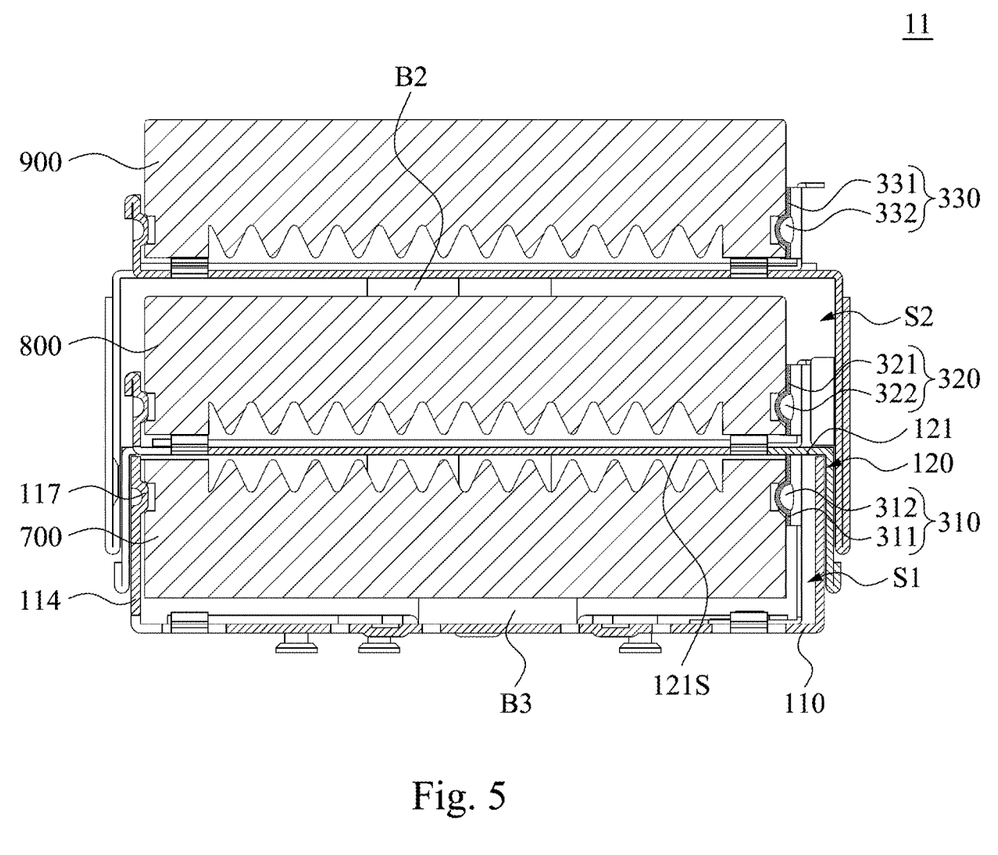
FIG. 5 is a cross-sectional view of a disk holding device according to one embodiment of the disclosure wherein the cross-sectional direction is the same as in FIG. 2.

FIG. 5 is a cross-sectional view of a disk holding device 11 according to one embodiment of the disclosure, in which the cross-sectional direction is the same as that in FIG. 2. In the embodiment, the disk holding device 11 of FIG. 5 is substantially the same as the disk holding device 10 of FIG. 1, but at least one difference of the disk holding device 11 of FIG. 5 from the disk holding device 10 of FIG. 1 is that the first toolless fixing portion 310 is disposed on the first cover body 120, rather than on the bottom case 110. For example, the first engaging elastic plate 311 of the first toolless fixing portion 310 is disposed on an inner surface 121S of the first cover body 120 facing towards the first receiving space S1, and arranged opposite to the second side plate 114 of the bottom case 110. Thus, the first electronic unit 700 can be directly sandwiched between the first engaging elastic plate 311 and the second side plate 114 of the bottom case 110. Also, a third cushion member B3 is further provided between the first loading surface 112 and the first electronic unit 700, such that the third cushion member B3 not only electrically isolates the first electronic unit 700 from the bottom case 110, but also reduces vibrations generated from the first electronic unit 700 within the first receiving space S1.

Figure 6:
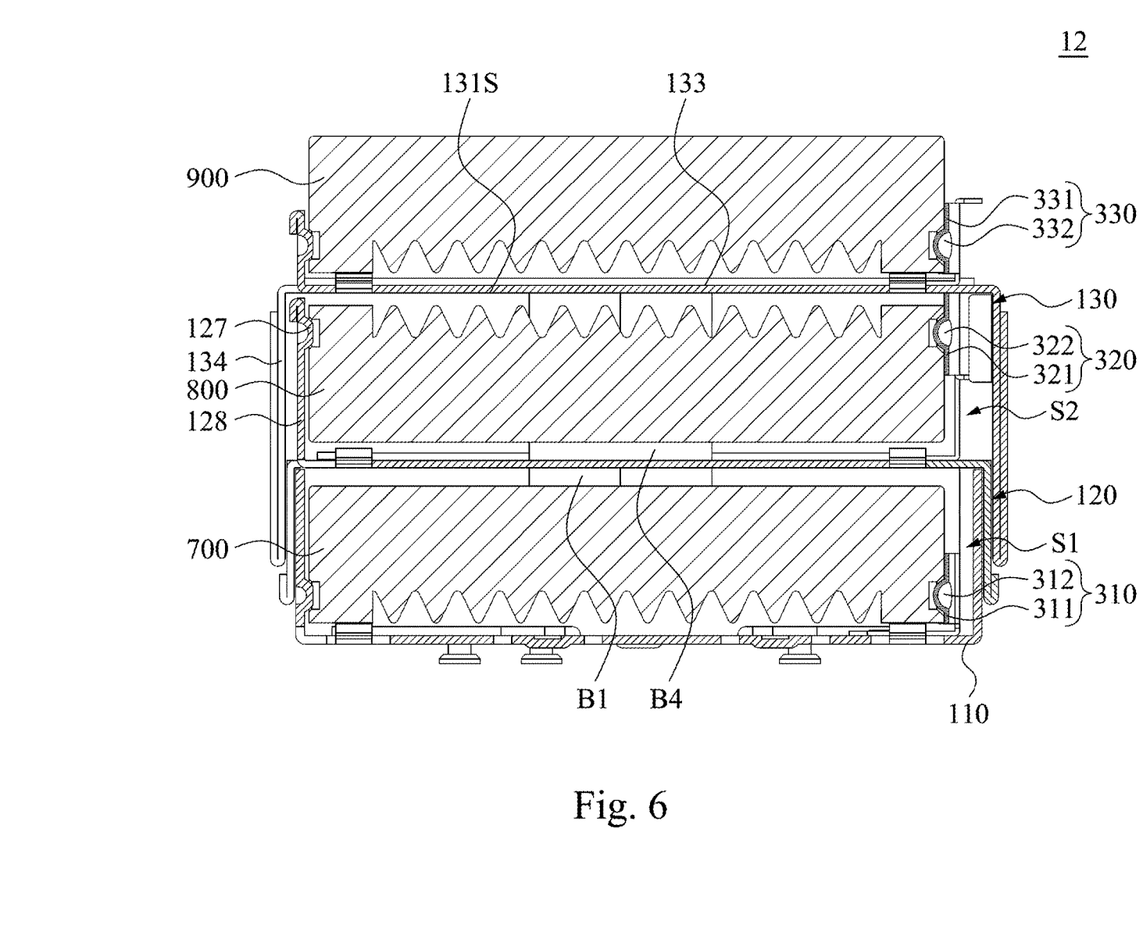
FIG. 6 is a cross-sectional view of a disk holding device according to one embodiment of the disclosure wherein the cross-sectional direction is the same as in FIG. 2.

FIG. 6 is a cross-sectional view of a disk holding device 12 according to one embodiment of the disclosure, in which the cross-sectional direction is the same as that in FIG. 2. In another embodiment, the disk holding device 12 of FIG. 6 is substantially the same as the disk holding device 10 of FIG. 1, but at least one difference of the disk holding device 12 of FIG. 6 from the disk holding device 10 of FIG. 1 is that the second engaging elastic plate 321 of the second toolless fixing portion 320 is disposed on one inner surface 131S of the second cover body 130 facing towards the second receiving space S2, rather than on the first cover body 120. For example, the second engaging elastic plate 321 of the second toolless fixing portion 320 is disposed on an inner surface 131S of the second cover body 130 facing towards the second receiving space S2, and arranged opposite to the first ribs 128 of the first cover body 120. Thus, the second electronic unit 800 can be directly sandwiched between the second engaging elastic plate 321 and the first ribs 128 of the first cover body 120. Also, a fourth cushion member B4 is further provided between the second loading surface 122 and the second electronic unit 800, such that the fourth cushion member B3 not only electrically isolates the second electronic unit 800 from the first cover body 120, but also reduces vibrations generated from the second electronic unit 800 within the second receiving space S2.

Figure 7:
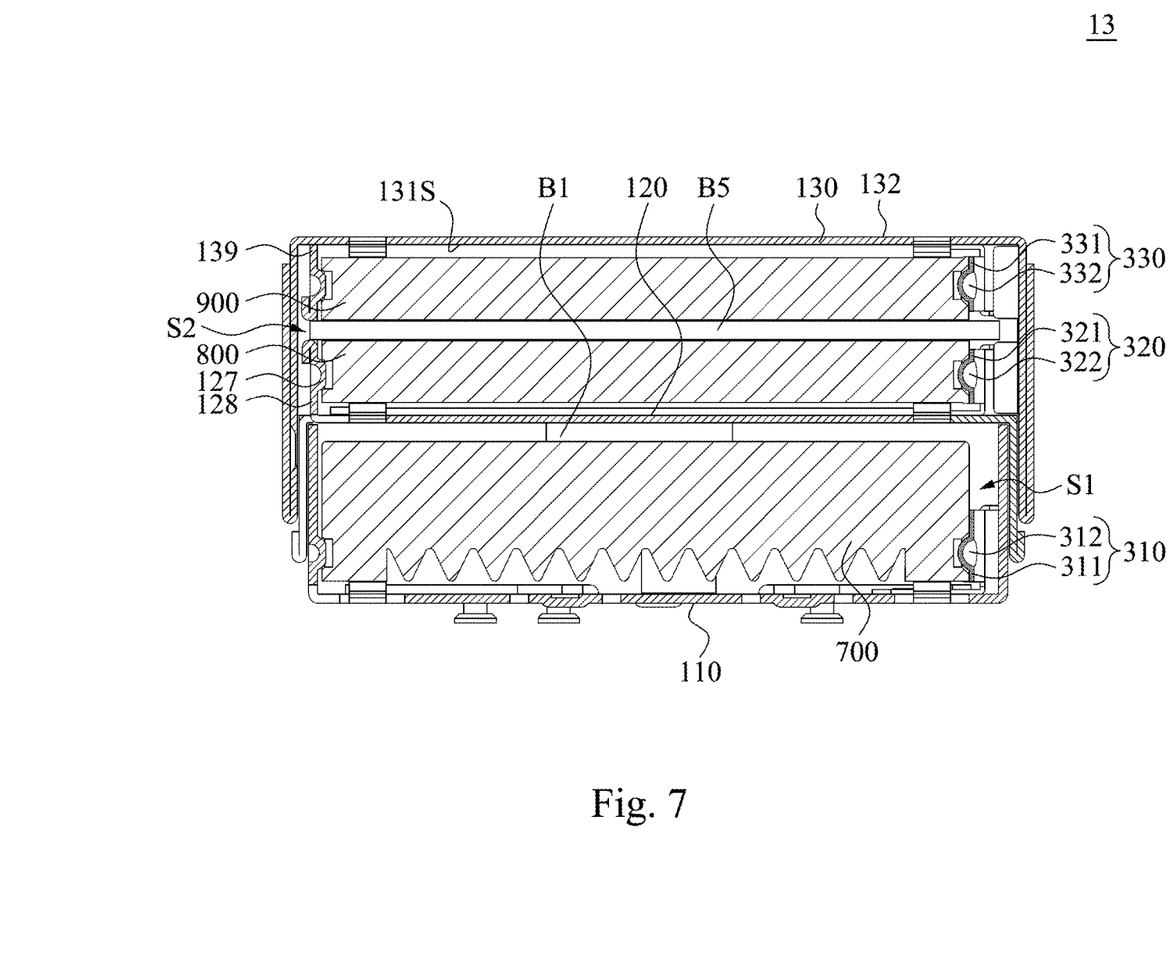
FIG. 7 is a cross-sectional view of a disk holding device according to one embodiment of the disclosure wherein the cross-sectional direction is the same as in FIG. 2.

FIG. 7 is a cross-sectional view of a disk holding device 13 according to one embodiment of the disclosure, in which the cross-sectional direction is the same as that in FIG. 2. In another embodiment, the disk holding device 13 of FIG. 7 is substantially the same as the disk holding device 12 of FIG. 6, but at least one difference of the disk holding device 13 of FIG. 7 from the disk holding device 12 of FIG. 6 is that the third toolless fixing portion 330 is disposed on one inner surface 131S of the second cover body 130 facing towards the second receiving space S2, and the second toolless fixing portion 320 and the third toolless fixing portion 330 are disposed opposite to each other within the second receiving space S2 such that the third electronic unit 900 can be disposed on the inner surface 131S of the second cover body 130 facing towards the second receiving space S2, and both of the second electronic unit 800 and the third electronic unit 900 are received within the second receiving space S2. Thus, the third loading surface 132 is available for placing additional electronic units so as to increase the number of electronic units that can be carried by the disk holding device 13.

For example, the third engaging elastic plate 331 of the third toolless fixing portion 330 is disposed on an inner surface 131S of the second cover body 130 facing towards the second receiving space S2, and arranged opposite to the second rib 139 of the second cover body 130. Thus, the third electronic unit 900 can be directly sandwiched between the third engaging elastic plate 331 and the second rib 139 of the second cover body 130. Also, a fifth cushion member B5 is further provided between the second electronic unit 800 and the third electronic unit 900, such that the fifth cushion member B5 not only electrically isolates the second electronic unit 800 from the third electronic unit 900, but also reduces vibrations generated from the second electronic unit 800 from the third electronic unit 900 within the second receiving space S2.

Figure 8:
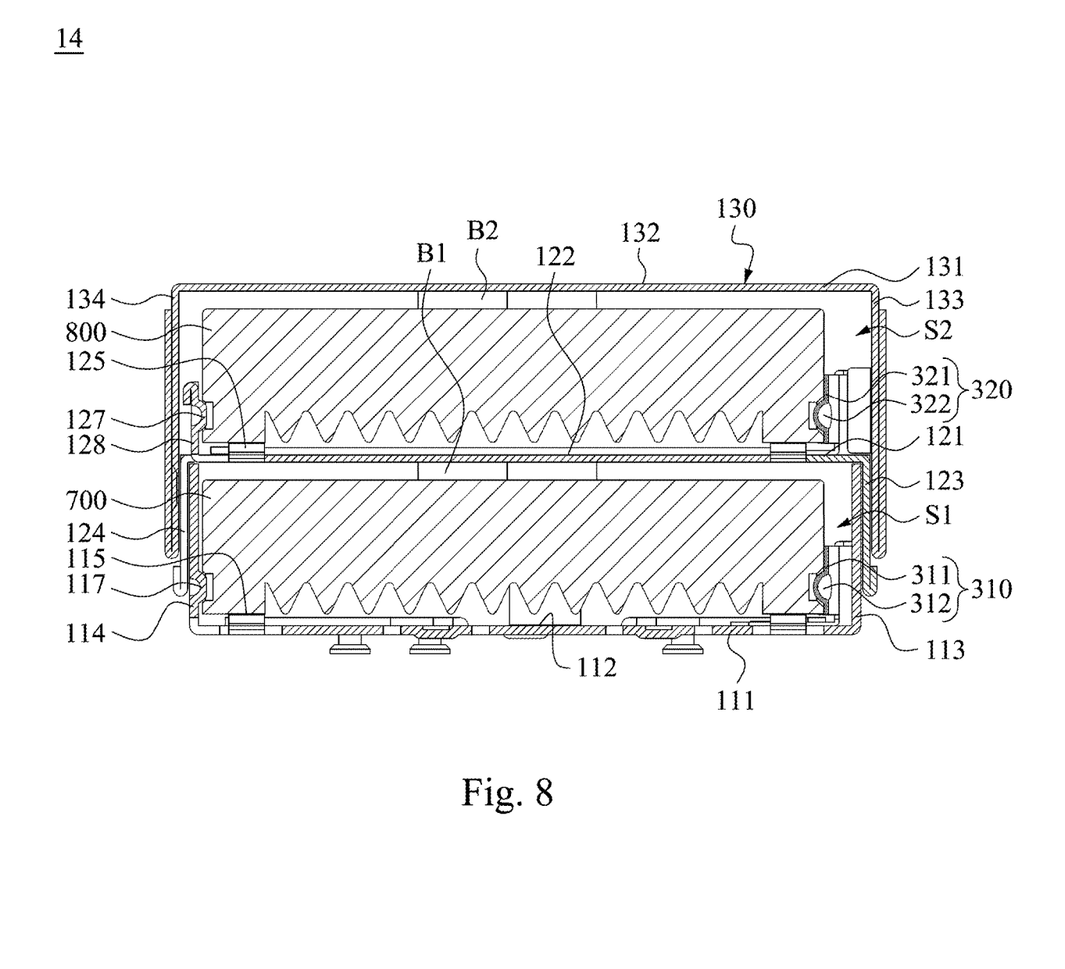
FIG. 8 is a cross-sectional view of a disk holding device according to one embodiment of the disclosure wherein the cross-sectional direction is the same as in FIG. 2.

FIG. 8 is a cross-sectional view of a disk holding device 14 according to one embodiment of the disclosure, in which the cross-sectional direction is the same as that in FIG. 2. In another embodiment, the disk holding device 14 of FIG. 8 is substantially the same as the disk holding device 10 of FIG. 1, however, at least one difference of the disk holding device 14 of FIG. 8 from the disk holding device 10 of FIG. 1 is that one side of the second cover body 130 opposite to the second receiving space S2 is not purposed for placing the third electronic unit 900, i.e. only the first electronic unit 700 and the second electronic unit 800 are respectively received within the first receiving space S1 and the second receiving space S2 in the disk holding device 14. More particularly, one surface (i.e., third loading surface 132) of the second cover body 130 opposite to the second receiving space S2 does not have any toolless fixing portion, that is, does not have the third toolless fixing portion and the third pressing portion.

Thus, through the construction of the disk holding device and the multi-unit receiving mechanism of the embodiments above, the electronic units can be rapidly inserted into or removed from the multi-unit receiving mechanism, thereby overcoming the above-mentioned disadvantages of complex process, inconvenient operation and time waste.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A mechanism for receiving multiple units, the mechanism comprising:
   a bottom case;
   a first cover body that is pivotally connected to the bottom case and pivots to cover the bottom case, such that a first receiving space is defined between the bottom case and the first cover body;
   a second cover body that is pivotally connected to the first cover body and pivots to cover the first cover body and the bottom case such that a second receiving space is defined between the first cover body and the second cover body;
   a first toolless fixing portion that is disposed within the first receiving space for removably holding a first electronic unit;
   a second toolless fixing portion that is disposed within the second receiving space for removably holding a second electronic unit; and
   a third toolless fixing portion that is disposed on the second cover body for removably holding a third electronic unit.

2. The mechanism of claim 1, wherein the first toolless fixing portion is disposed on the bottom case or the first cover body.

3. The mechanism of claim 1, wherein the second toolless fixing portion is disposed on the first cover body or the second cover body.

4. The mechanism of claim 1, wherein the third toolless fixing portion is disposed on one surface of the second cover body facing towards the second receiving space; or
   the third toolless fixing portion is disposed on one surface of the second cover body opposite to the second receiving space.

5. The mechanism of claim 1, wherein the second toolless fixing portion and the third toolless fixing portion are opposite arranged in the second receiving space.

6. The mechanism of claim 1, wherein the first toolless fixing portion comprises:
   a first engaging elastic plate that is disposed opposite to one side plate of the bottom case; and
   at least one first engaging bump that is formed on the first engaging elastic plate, such that the first electronic unit is directly sandwiched between the at least one first engaging bump and the one side plate of the bottom case.

7. The mechanism of claim 1, wherein the second toolless fixing portion comprises:
a second engaging elastic plate that is disposed opposite to one side plate of the first cover body; and
at least one second engaging bump that is formed on the second engaging elastic plate, such that the second electronic unit is directly sandwiched between the at least one second engaging bump and the one side plate of the first cover body.

8. The mechanism of claim 1, wherein the third toolless fixing portion comprises:
a third engaging elastic plate that is disposed opposite to one side plate of the second cover body; and
at least one third engaging bump that is formed on the third engaging elastic plate, such that the third electronic unit is directly sandwiched between the at least one third engaging bump and the one side plate of the second cover body.

9. The mechanism of claim 1, further comprising:
a first fastening portion that is disposed on the bottom case; and
a second fastening portion that is disposed on the second cover body, and detachably fastened with the first fastening portion,
wherein, when the second fastening portion is fastened with the first fastening portion, the first cover body is fixedly sandwiched between the bottom case and the second cover body.

10. The mechanism of claim 1, further comprising:
a first cushion member that is disposed within the first receiving space, and between the bottom case and the first cover body; and
a second cushion member that is disposed within the first receiving space, and between the first cover body and the second cover body.

11. The mechanism of claim 1, further comprising:
a first holding bracket that is disposed within the first receiving space for guiding and stably receiving a first connector;
a second holding bracket that is disposed within the second receiving space for guiding and stably receiving a second connector; and
a third holding bracket that is disposed on the second cover body for guiding and stably receiving a third connector.

12. The mechanism of claim 1, wherein the bottom case, the first cover body and the second cover body are pivotally connected to one another coaxially.

13. A mechanism for receiving multiple units, the mechanism comprising:
a bottom case comprising a first loading surface and a first toolless fixing portion disposed on the first loading surface for removably holding a first electronic unit;
a first cover body rotatably covering the bottom case, and comprising a second loading surface and a second toolless fixing portion disposed on the second loading surface for removably holding a second electronic unit; and
a second cover body rotatably covering the bottom case and the first cover body, and comprising a third loading surface and a third toolless fixing portion disposed on the third loading surface for removably holding a third electronic unit,
wherein the first loading surface, the second loading surface and the third loading surface are overlapped with one another such that a normal line of the first loading surface passes through both of the second loading surface and the third loading surface simultaneously.

14. The mechanism of claim 13, wherein the first toolless fixing portion comprises:
a first engaging elastic plate that is disposed opposite to one side plate of the bottom case; and
at least one first engaging bump that is formed on the first engaging elastic plate, such that the first electronic unit is directly sandwiched between the at least one first engaging bump and the one side plate of the bottom case.

15. The mechanism of claim 13, wherein the second toolless fixing portion comprises:
a second engaging elastic plate that is disposed opposite to one side plate of the first cover body; and
at least one second engaging bump that is formed on the second engaging elastic plate, such that the second electronic unit is directly sandwiched between the at least one second engaging bump and the one side plate of the first cover body.

16. The mechanism of claim 13, wherein the third toolless fixing portion comprises:
a third engaging elastic plate that is disposed opposite to one side plate of the second cover body; and
at least one third engaging bump that is formed on the third engaging elastic plate, such that the third electronic unit is directly sandwiched between the at least one third engaging bump and the one side plate of the second cover body.

17. The mechanism of claim 13, further comprising:
a first fastening portion that is disposed on the bottom case; and
a second fastening portion that is disposed on the second cover body, and detachably fastened with the first fastening portion,
wherein, when the second fastening portion is fastened with the first fastening portion, the first cover body is fixedly sandwiched between the bottom case and the second cover body.

18. The mechanism of claim 13, further comprising:
a first cushion member that is disposed between the bottom case and the first cover body; and
a second cushion member that is disposed between the first cover body and the second cover body.

19. The mechanism of claim 13, further comprising:
a pivot shaft connecting the bottom case, the first cover body and the second cover body together such that the first cover body is enabled to movably cover the bottom case, and the second cover body is enabled to movably cover the first cover body.

20. A mechanism for receiving multiple units, the mechanism comprising:
a bottom case;
a first cover body;
a second cover body, wherein the first cover body is disposed between the bottom case and the second cover body, a first receiving space is defined between the bottom case and the first cover body, and a second receiving space is defined between the first cover body and the second cover body;
a pivot shaft pivotally connected to the bottom case, the first cover body and the second cover body such that the first cover body is enabled to movably cover the bottom case, and the second cover body is enabled to movably cover the first cover body;
a first toolless fixing portion that is disposed within the first receiving space for removably holding a first electronic unit; and
a second toolless fixing portion that is disposed within the second receiving space for removably holding a second electronic unit,
wherein one surface of the second cover body opposite to the second receiving space does not have any toolless fixing portion.

\* \* \* \* \*